Figure 1:
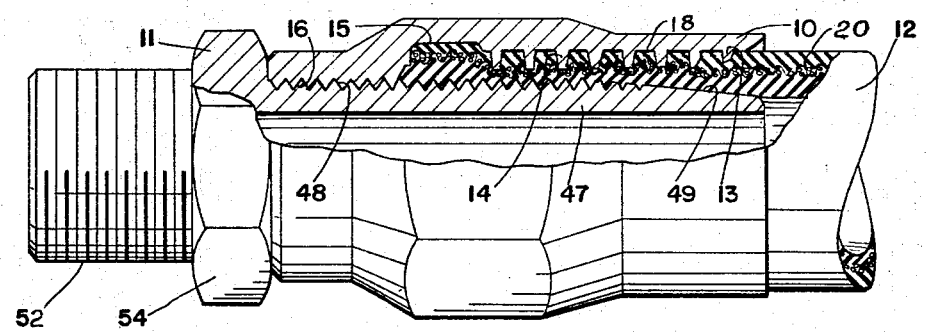

Nov. 22, 1966   W. E. CURRIE   3,287,033
HOSE COUPLING
Filed May 24, 1963

INVENTOR.
WILLIAM E. CURRIE
BY
John N. Wolfram
ATTORNEY

U̲n̲i̲t̲e̲d̲ ̲S̲t̲a̲t̲e̲s̲ ̲P̲a̲t̲e̲n̲t̲ ̲O̲f̲f̲i̲c̲e̲

3,287,033
Patented Nov. 22, 1966

3,287,033
HOSE COUPLING
William E. Currie, Cleveland Heights, Ohio, assignor to Parker-Hannifin Corporation, Cleveland, Ohio, a corporation of Ohio
Filed May 24, 1963, Ser. No. 283,014
9 Claims. (Cl. 285—40)

This invention relates to hose couplings of the socket and nipple type for coupling hose which has inner and outer layers of rubber-like material and one or more intermediate layers of reinforcement material.

Hose of the type described is used for hydraulic and other installations utilizing high fluid pressures and metallic or other high strength reinforcement is necessary to keep the hose from bursting. In order to keep couplings on hose of this type from blowing off, it is necessary to secure a tight grip upon the reinforcement. In some forms of couplings, this is done by stripping away the outer layer of rubber on that part of the hose which is to be within the coupling so that the coupling may grip directly upon the exterior surface of the reinforcement. In another form of coupling for hose of this type, the outer layer of rubber is not stripped from the hose but the coupling socket is formed with threads which press through the outer layer to engage the reinforcement to secure a tight grip upon the hose. The present invention is an improvement over the latter type of coupling.

It is an object of the present invention to provide a coupling for hose of the type described in which the coupling socket has a sharp thread for cutting a spiral path in the outer layer of the hose and has blunt teeth which follow in the path as the socket is threaded onto the hose and engage the reinforcement, the blunt threads being so formed and spaced from each other, and of a depth and diameter with relation to the outer layer that the reinforcement will become arched between the blunt teeth when the nipple is inserted into the assembled hose and socket and form gripping shoulders engaged by the blunt threads for increasing the effective grip of the socket upon the hose.

It is another object to provide a hose coupling of the type described in which there is a recess in the socket next to the innermost blunt thread, forming a chamber which has a volume somewhat greater than the volume of the hose portion received therein so as to permit the reinforcement to flare outwardly and form a holding shoulder at the innermost thread.

It is another object to provide a coupling of the type described in which there is a sharp thread which has a first portion of gradually decreasing minor diameter for initiating cutting of a helical slit in the outer layer of a hose and which has a second portion of uniform minor diameter for continuing cutting of the slit.

It is another object to provide a special shaping for the sharp thread with an abrupt transition from the sharp to the blunt threads, such abrupt transition causing formation of a crevice-like crack between the slit bottom and the reinforcement in the event the slit is not cut completely through the outer layer due to inward yielding of the hose during assembly to the socket, such crack facilitating separation of the hose material to permit entry of the blunt thread to the reinforcement upon insertion of the nipple.

Figure 2:
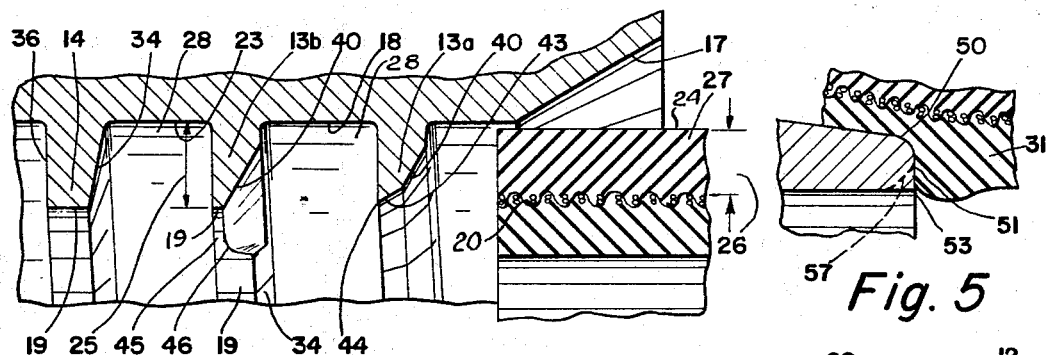
Figure 3:
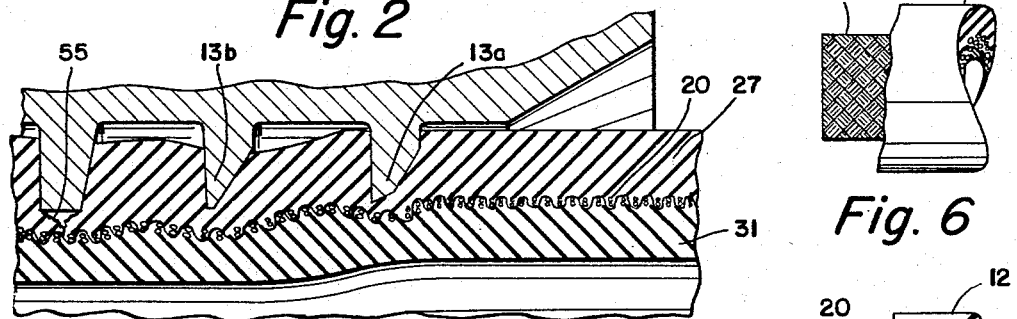
Figures 4, 5, 6, 7:
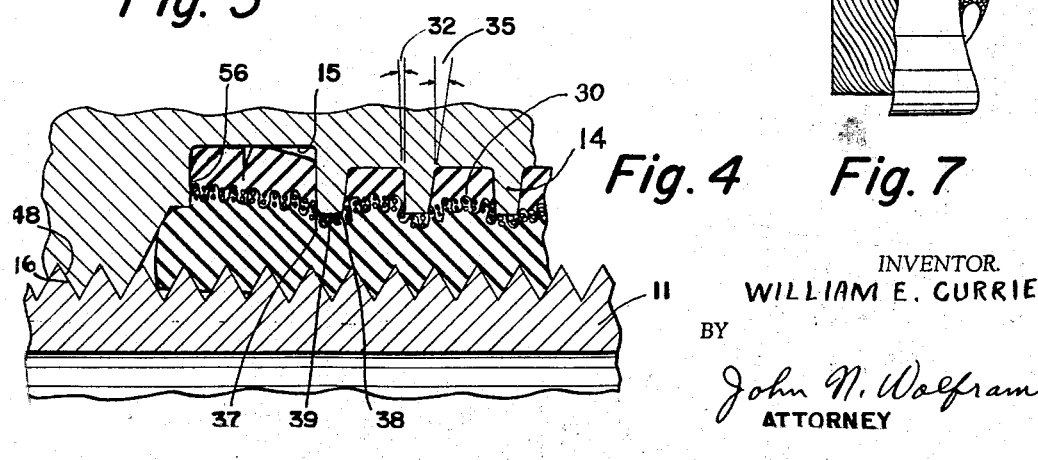

Other objects of the invention will be apparent from the following description and from the drawings in which:

FIG. 1 is a view, partly in longitudinal cross section, of the coupling assembled upon a hose, FIG. 2 is an enlarged fragmentary section view of the outer end of the coupling socket prior to insertion of the hose, FIG. 3 is an enlarged fragmentary cross section view showing the socket on the hose before the nipple is inserted, FIG. 4 is an enlarged fragmentary cross section view showing the inner end of the socket after the nipple has been inserted to clamp the hose, FIG. 5 is an enlarged fragmentary section view of the lead end of the nipple showing how it enters the hose, FIG. 6 is a view of a hose end with part of the outer layer cut away to show reinforcement of braided form, FIG. 7 is a view of a hose end with part of the outer layer cut away to show reinforcement of spiral wrap form.

The coupling includes a socket 10 and a nipple 11 for assembly upon a hose 12. The socket has from one to two sharp internal threads 13 and a plurality of blunt internal threads 14 which lead to an undercut 15 toward the inner end of the socket. Threads 13 and 14 are in the form of a continuous helix with like pitch and are preferably left handed when thread 16 is right handed. Adjacent undercut 15 the socket has a threaded opening 16.

At its outer end the socket has a chamfer 17, which is preferably at an angle of about 30° with the axis of the coupling, to facilitate entrance of the hose, the latter frequently being slightly flared at its end due to slight expansion of the reinforcement when the hose is cut to length. Chamfer 17 leads to the bore, generally indicated at 18, in which threads 13 and 14 are formed. The threads in this bore are of special shaping and dimensioning which have been found very effective for accomplishing the desired purpose. The minor diameters 19 of threads 13, 14 are slightly smaller than the initial outside diameter of the steel wire reinforcement 20 of the hose and the major diameters 23 of the threads are greater than the initial outside diameter 24 of the hose. The difference in diameters between the latter is such that the depth 25 of the thread is about 10% greater than the maximum initial thickness 26 of the hose outer layer 27. This assures that the spaces 28 between the threads will have room for permitting arching of the reinforcement thereinto and for receiving hose material displaced by the threads so as to substantially completely fill the spaces without excessive compression of the hose material therein. Excessive compression would make it too difficult to assemble the nipple to the coupling and would also interfere with arching of the reinforcement into the spaces 28.

Arching of the reinforcement into spaces 28, as indicated at 30, is further facilitated by proper selection of the pitch of the socket thread and dimensioning of the width of spaces 28 relative to the width of the thread cross section. Thus, when the reinforcement 20 is of braided form, as illustrated in FIG. 6, the pitch should be as least 10% of the nominal outside diameter of the reinforcement or ten times the wire cross section diameter, whichever is greatest. When a spiral wrap type of reinforcement as shown in FIG. 7 is used, the pitch should be at least 14% of the outside diameter of the reinforcement or thirteen times the wire cross section, whichever is greatest. With these pitches it has been found that the maximum width of the thread cross section should be about one half the minimum width of the space between the threads. Thus, for a hose with braided reinforcement of .719" outside diameter and .012" wire cross section diameter, the pitch should be about ⅛", the width of the thread at its major diameter should be about .043" and the width of space 28 at the major diameter should be about .082".

Blunt threads 14 should be narrow in cross section in order to follow in the track cut into the outer layer by sharp threads 13 but must be sufficiently sturdy to withstand very high radial forces. They must also be able to withstand axial forces tending to bend the threads toward the outer end of the socket, such axial forces being impressed upon the threads during assembly of the nipple due to the taper of the nipple. In order to maintain the width of the thread cross section to a minimum and yet provide sufficient strength against bending and callapsing, the outer flanks 34 are tapered at an angle of from 5 to 9° as indicated at 35. Flanks 36 on the inner side may be at right angles to the longitudinal axis but are preferably tapered about 2°, as indicated at 32, to facilitate manufacture. Corners 37, 38 at the minor diameter of the blunt threads are sharp so that the inner surface 39 is as wide as possible for clamping contact with reinforcement 20 without cutting of the reinforcement. The width of the threads at their major diameter is about two thirds the height of the thread.

The first one to two threads in the sockets are initially formed the same as the blunt threads and are then sharpened so that they will cut into the outer layer 27 of the hose to form a helical track into which the blunt threads follow. The sharpening is accomplished by cutting away the outer flank at an angle of about 60° with the horizontal axis of the socket, as indicated at 40. A first portion 13a of the thread at the outer end of the socket is further cut away as at 43 by the tool which forms chamfer 17 so that this part of the thread has a perfectly sharp corner 44, that is, of less than .003" width or flat, which readily cuts into outer layer 27 of the hose. A second or remaining portion 13b of the sharp threads has a slight truncation, indicated at 45, which is of about .010" maximum width. The cutaway flanks 40 for forming the sharp threads ends abruptly at 46 and from there on the minor diameter 19 is of full width.

Because of chamfer 17 intersecting sharp threads 13, the first portion 13a of the latter has a minor diameter which gradually decreases from a diameter substantially equal to the major diameter of the thread to the minor diameter of the second portion 13b of the sharp thread which is not intersected by chamfer 17, the minor diameter of the second portion 13b being preferably the same as the minor diameter of blunt threads 14.

Nipple 11 has an elongated sleeve portion 47 which is threaded as at 48 throughout most of its length but which has a gradual taper 49 of about 10° included angle at its forward end. The outer tip of sleeve portion 47 is rounded at its outer corner as at 50 but is sharp at its radial inner corner 53, as shown in FIG. 5. One end of the nipple may have a hexagonal portion 54 for engagement by a wrench and a threaded portion 52 for connection to another device. In other forms of the nipple thread 52 may be omitted and an internally threaded swivel nut attached to the nipple so that the nipple may be connected to an externally threaded part.

When assembling the coupling, the socket 10 is first threaded upon the hose. As the hose enters the socket, the sharp threads 13 slice into the outer layer 27 to form a helical track therein. As shown in FIG. 3, the hose will at this time contract somewhat in diameter and the first portion 13a of the sharp threads 13 cut part way into the outer layer and the second portion 13b cuts to a further depth but not quite all the way through the outer layer 27. Due to the abrupt transition from a sharp thread to a blunt thread at 46, as the blunt thread enters the track made by the sharp thread the bottom of the track is suddenly widened, causing a portion of the outer layer underneath the blunt thread to form a crevice-like split 55. The socket is threaded onto the hose until the end of the hose butts against shoulder 56 at the inner end of undercut 15. As the end of the hose enters undercut 15, it expands outwardly beyond its original diameter.

The nipple is then inserted into the socket and threaded into position by means of thread 16 and 48. As the end of the nipple advances into the hose, it expands the hose so that the outer layer 27 will substantially completely fill spaces 28 between the thread and so that reinforcement 20 will be forced tightly against the minor diameter 19 of the blunt threads. At the same time, the inner layer 31 of the hose is tightly compressed against the tapered portion of the nipple to establish tight sealing contact therewith.

As the hose is being expanded by the nipple, the cracks or crevices 55 split further so that there is a complete separating of the outer layer underneath blunt threads 14 so that the latter will directly engage reinforcement 20.

Because of the high clamping pressure exerted on the hose between the nipple and blunt threads, and because of the sizing of spaces 28 as previously described, the reinforcement 20 will become arched, as at 30, between the blunt threads. This arching forms holding shoulders on the reinforcement which are very effective for increasing the resistance to pullout of the hose from the coupling. The reinforcement within undercut 15 also flares outwardly for increasing the pullout resistance. Arching of the reinforcement 20 between the blunt teeth is further facilitated by the fact that spaces 28 are deeper than the inital thickness of the outer layer 27 and of greater diameter than the initial outer diameter thereof so as to be large enough to receive material of the outer layer which is forced thereinto without substantial compression of the latter. Likewise, undercut 15 permits substantial filling thereof without substantial compression of the hose end and thus permits flaring of the reinforcement at this location to form a holding shoulder adjacent the innermost thread. Since there is no excessive compression of the outer layer within spaces 28 and undercut 15, there is less force required for assembling the nipple to the socket. This is quite important because considerable force is required for compressing the inner layer and reinforcement between the nipple and the blunt threads for establishing a satisfactory seal and grip upon the hose. Since this force requirement is already very high, it is important to minimize any additional assembly force caused by other factors.

As the nipple is being threaded into the coupling, the front end of the nipple engages the inner layer 31 to force the hose to a larger diameter. Since the inside diameter of the hose has been contracted by the socket, the nipple must cam or force the inner diameter of the hose outwardly. In doing this, there is a buildup of the inner layer material in front of the nipple. With the outer corner of the nipple rounded as at 50 and with the inner corner sharp as at 53, the outer end 51 of the nipple presents the broadest surface possible between the inner corner 53 and the radiused outer edge 50 to prevent slicing of the nipple into the inner layer. Thus, if the inner corner were rounded as shown by the dotted line 57, the area of the outer surface 51 would be reduced and the nipple would much more readily cut into the inner layer.

Reinforced hose of the type for which these couplings are designed are used for every high pressures, such pressures often reaching 12,000 p.s.i. In order to prevent the hose from leaking and blowing off from the coupling at these high pressures, the coupling must exert an extremely high clamping pressure upon the reinforcement and the inner layer. It has been found that the present invention is very effective for obtaining such high clamping pressures with a minimum of bulk in the coupling and with assembly torques that can be readily managed with hand tools.

Although one form of the invention has been illustrated and described, it is apparent that many changes may be made in the detail configuration thereof within the scope of the invention as defined by the claims.

I claim:

1. A hose coupling for gripping the end of a flexible hose which has inner and outer layers and a reinforcement therebetween, said coupling including a socket and a nipple, said socket having an internally threaded bore open at one end, said thread at said open end being relatively sharp at its minor diameter for cutting a helical slit in said outer layer upon threading of said socket over said hose end, and the threads inward of said sharp thread being relatively blunt at their minor diameter and received in said helical slit, said nipple being insertible in said hose end after threading of said socket onto said hose, said blunt threads having a minor diameter up to the initial outside diameter of said reinforcement and said blunt threads having annular spaces therebetween which are at least as great in diameter as the initial outside diameter of said outer layer, said sharp thread having a minor diameter which gradually decreases from a diameter greater than the initial outside diameter of said reinforcement to the minor diameter of said blunt threads, and said nipple having an outside diameter larger than the inside diameter of said inner layer after insertion of said hose into said socket, whereby upon insertion of said nipple into said hose end, said reinforcement is forced into tight gripping engagement with the minor diameter of said blunt threads and the portions of said reinforcement opposite the spaces between said blunt threads are arched into said spaces to form holding shoulders on said reinforcement engaged by said blunt threads for increasing the effective grip of said socket upon said hose end.

2. A hose coupling for gripping the end of a flexible hose which has inner and outer layers and a reinforcement therebetween, said coupling including a socket and a nipple, said socket having an internally threaded bore open at one end, said thread at said open end being relatively sharp at its minor diameter for cutting a helical slit in said outer layer upon threading of said socket over said hose end, and the threads inward of said sharp thread being relatively blunt at their minor diameter and received in said helical slit, said nipple being insertible in said hose end after threading of said socket onto said hose, said blunt threads having inner and outer flanks which are tapered to a maximum of about 2° to 9° respectively with respect to a plane normal to the axis of said thread, with the tapers each extending in a direction for making the minor diameter of the thread cross section of less width than the major diameter and intersecting the minor diameter to form sharp corners therewith, said blunt threads having a minor diameter up to the initial outside diameter of said reinforcement and said blunt threads having annular spaces therebetween which are at least as great in diameter as the initial outside diameter of said outer layer, and said nipple having an outside diameter larger than the inside diameter of said inner layer after insertion of said hose into said socket, whereby upon insertion of said nipple into said hose end, said reinforcement is forced into tight gripping engagement with the minor diameter of said blunt threads and the portions of said reinforcement opposite the spaces between said blunt threads are arched into said spaces to form holding shoulders on said reinforcement engaged by the inner corners of said blunt threads for increasing the effective grip of said socket upon said hose end.

3. In combination, a hose coupling and a flexible hose which has inner and outer layers and a reinforcement therebetween, said coupling including a socket and a nipple, said socket having an internally threaded bore open at one end, said thread at said open end being relatively sharp at its minor diameter for cutting a helical slit in said outer layer upon threading of said socket over the end of said hose, and the threads inward of said sharp thread being relatively blunt at their minor diameter and received in said helical slit, said nipple having been inserted in said hose end after threading of said socket onto said hose, said reinforcement being of braided wire and the pitch of said threads being approximately ten times the cross section dimension of said reinforcement wire, said nipple being of a diameter whereby upon insertion of the same into said hose end said reinforcement is forced into tight gripping engagement with the minor diameter of said blunt threads and the portions of said reinforcement opposite the spaces between said blunt threads are arched into said spaces to form holding shoulders on said reinforcement engaged by said blunt threads for increasing the effective grip of said socket upon the hose end.

4. In combination, a hose coupling and a flexible hose which has inner and outer layers and a reinforcement therebetween, said coupling including a socket and a nipple, said socket having an internally threaded bore open at one end, said thread at said open end being relatively sharp at its minor diameter for cutting a helical slit in said outer layer upon threading of said socket over the end of said hose and the threads inward of said sharp thread being relatively blunt at their minor diameter and received in said helical slit, said nipple having been inserted in said hose end after threading of said socket onto said hose, said reinforcement being of spiral wrapped wire and the pitch of said threads being approximately thirteen times the cross section dimension of said reinforcement wire, said nipple being of a diameter whereby upon insertion of the same into said hose end said reinforcement is forced into tight gripping engagement with the minor diameter of said blunt threads and the portions of said reinforcement opposite said spaces between said blunt threads are arched into said spaces to form holding shoulders on said reinforcement engaged by said blunt threads for increasing the effective grip of said socket upon said hose end.

5. A hose coupling for gripping the end of a flexible hose which has inner and outer layers and a reinforcement therebetween, said coupling including a socket and a nipple, said socket having an internally threaded bore open at one end, said thread at said open end being relatively sharp at its minor diameter for cutting a helical slit in the outer layer upon threading of said socket over said hose end, and the threads inward of said sharp thread being relatively blunt at their minor diameter and received in said helical slit, said nipple being insertible in said hose end after threading of the socket onto said hose and serving to clamp said hose end within said threaded bore with the minor diameter of said blunt threads in tight engagement with said reinforcement, said sharp thread having first and second portions, said first portion at its minor diameter having a width less than the width of said second portion at its minor diameter.

6. The coupling of claim 5 in which the width of said first portion at its minor diameter is up to .003" and the width of said second portion at its minor diameter is approximately .010".

7. The coupling of claim 5 in which the threaded bore is chamfered at its open end and said chamfer intersects said thread to form a sharp corner at said first portion.

8. The coupling of claim 5 in which the minor diameter of said first portion of said sharp thread at the open end of said socket is greater than the minor diameter of said second portion and decreases gradually from such greater diameter to the minor diameter of said second portion.

9. A hose coupling for gripping the end of a flexible hose which has inner and outer layers and a reinforcement therebetween, said coupling including a socket and a nipple, said socket having an internally threaded bore open at one end, said thread at said open end being relatively sharp at its minor diameter for cutting a helical slit in said outer layer upon threading of said socket over said hose end, and the threads inward of said sharp thread being relatively blunt at their minor diameter and received in said helical slit, said nipple being insertible in said hose end after threading of said socket onto said hose and serving to clamp said hose end within said threaded bore with the minor diameter of the blunt threads in tight engagement with said reinforcement, said relatively sharp thread merging abruptly into said relatively blunt thread.

References Cited by the Examiner

UNITED STATES PATENTS

| | | | |
|---|---|---|---|
| 2,371,971 | 3/1945 | Main | 285—247 |
| 2,465,556 | 3/1949 | Taylor | 285—40 |
| 2,816,781 | 12/1957 | Woodling | 285—259 |
| 2,965,395 | 12/1960 | Schmohl et al. | 285—40 |
| 3,127,672 | 4/1964 | Kretschmer | 285—40 |

FOREIGN PATENTS 539,214    4/1957  Canada.

CARL W. TOMLIN, *Primary Examiner.*

THOMAS F. CALLAGHAN, *Examiner.*